(12) United States Patent
Van Blokland (10) Patent No.: US 12,302,911 B2
(45) Date of Patent: May 20, 2025

(54) DOUGH HANDLING DEVICE

(71) Applicant: Radie B.V., Culemborg (NL)

(72) Inventor: Johannes Josephus Antonius Van Blokland, Culemborg (NL)

(73) Assignee: Radie B.V., Culemborg (NL)

( * ) Notice: Subject to any disclaimer, the term of this patent is extended or adjusted under 35 U.S.C. 154(b) by 675 days.

(21) Appl. No.: 17/571,579

(22) Filed: Jan. 10, 2022

(65) Prior Publication Data

US 2022/0338486 A1   Oct. 27, 2022

(30) Foreign Application Priority Data

Apr. 22, 2021 (EP) .................................... 21169853

(51) Int. Cl.
*A21C 3/02* (2006.01)
*A21C 3/10* (2006.01)
*A21C 9/08* (2006.01)

(52) U.S. Cl.
CPC . *A21C 3/02* (2013.01); *A21C 9/08* (2013.01)

(58) Field of Classification Search
CPC ................ A21C 3/02; A21C 3/10; A21C 9/08
See application file for complete search history.

(56) References Cited

U.S. PATENT DOCUMENTS

| | | | |
|---|---|---|---|
| 4,583,930 A | 4/1986 | Hayashi | |
| 4,631,021 A | 12/1986 | Hayashi | |
| 5,106,636 A * | 4/1992 | Ban | G01N 33/10 |
| | | | 426/517 |
| 5,272,962 A | 12/1993 | Kageyama | |

(Continued)

FOREIGN PATENT DOCUMENTS

| | | |
|---|---|---|
| EP | 2693174 A1 | 5/2014 |
| EP | 2846140 A1 | 3/2015 |

(Continued)

OTHER PUBLICATIONS

English Translation of DE102008016954A1 (Year: 2008).*
Extended European Search Report dated Nov. 2, 2021, Application No. 21169853.5.

*Primary Examiner* — Galen H Hauth
*Assistant Examiner* — Baileigh Kate Darnell
(74) *Attorney, Agent, or Firm* — The Dobrusin Law Firm, PC (57) ABSTRACT

The present invention relates to a dough handling device, comprising a dough sheeting stage, for delivering a dough sheet with a predetermined thickness and a controllable dough stretching or condensing stage, for locally stretching or condensing the dough sheet, comprising a first stretching or condensing conveyor belt with a controllable speed, configured for receiving the dough sheet from the dough sheeting stage and transporting said dough sheet in a direction of conveyance, from upstream to downstream and a second stretching or condensing conveyor belt with a controllable speed for transporting the dough sheet in said direction of conveyance, and a controller, for controlling the speed of the first stretching or condensing conveyor belt and/or the second stretching or condensing conveyor belt and/or the relative speed of the first stretching or condensing conveyor belt and the second stretching or condensing conveyor belt and therewith to locally alter the density and/or thickness of the dough sheet.

16 Claims, 4 Drawing Sheets

(56) References Cited

U.S. PATENT DOCUMENTS

| | | | |
|---|---|---|---|
| 2015/0064315 A1* | 3/2015 | van Blokland | G01G 11/04 |
| | | | 425/140 |
| 2015/0110930 A1* | 4/2015 | Morikawa | A21C 9/085 |
| | | | 425/140 |

FOREIGN PATENT DOCUMENTS

| | | |
|---|---|---|
| EP | 3409122 B1 | 12/2018 |
| JP | H0556743 A | 3/1993 |
| JP | H0697936 B2 | 4/1994 |
| TW | 200911124 A | 3/2009 |
| WO | 2016/027622 A1 | 2/2016 |

* cited by examiner

DOUGH HANDLING DEVICE

The present invention relates to a dough handling device. More in particular, the invention relates to a device for adapting the density and/or thickness of a dough sheet.

When industrially processing dough in order to form final products, one general working method is so called sheeting. Dough is made, and a sheet as uniform as possible is made out of it, which sheet is then subject to several processing operations to obtain the final product.

Since requirements regarding uniformity and reproducibility of end products are continuously growing and the bar for a reduction of waste during production processes is continuously raised, the specifications set to accuracy of dough sheet properties increase as well.

With a sheeting process, comprising one or more rolling stages, resolutions and accuracies within the range of a few percent can be reached when it comes to dough sheet parameters of the sheet thus obtained. Thickness, density and dimensional stability of the dough sheet are examples of those parameters. From that sheet individual products are made, wherein one of the first steps may be cutting the dough sheet into individual portions and separating those portions (directly) after cutting. An example of a device for that purpose is given in the International Patent publication WO201627622 by Rheon. Known alternatives are portioning devices that do not create a dough sheet as a first step. Examples of such devices are disclosed in U.S. patent applications U.S. Pat. Nos. 4,631,021 and 4,583,930A. These are techniques that are remote from the sheeting technique used according to the present invention.

There are cases now in which these resolutions are no longer sufficient and a need has raised for dough sheets with more accurately determined parameters. Another need has raised for dough sheets with well-determined but non-uniform parameters.

It is a goal of the present invention to provide a solution for the above mentioned problems, and/or to provide a useful alternative to the prior art.

The invention thereto proposes a dough handling device, comprising a dough sheeting stage, for delivering a dough sheet with a predetermined thickness (with a maximum of 40 and preferably 25 mm, wherein the dough sheeting stage is configured for delivering a dough sheet with thickness and/or density that has a fluctuation of less than 10% and preferably less than 5%, the dough handling device further comprising a controllable dough stretching or condensing stage, for locally stretching or condensing the dough sheet, comprising a first stretching or condensing conveyor belt with a controllable speed, configured for receiving, directly or indirectly, the dough sheet from the dough sheeting stage and transporting said dough sheet in a direction of conveyance, from upstream to downstream, a second stretching or condensing conveyor belt with a controllable speed for transporting the dough sheet in said direction of conveyance, extending in line with the first stretching or condensing conveyor belt, wherein an upstream end of the second stretching or condensing conveyor belt is adjacent to the downstream end of the first stretching or condensing conveyor belt, for taking over dough from the first stretching or condensing conveyor belt to the second stretching or condensing conveyor belt at a stretch-or-condense location, wherein the first and the second stretching or condensing conveyor belt each comprise: a mutually adjacent gripping area for gripping the dough sheet such that at least in a part of the gripping area, and preferably in the entire gripping area the sheet does not or essentially not slip with respect to the respective stretching or condensing conveyor belt, which gripping area extends from a first location upstream the downstream end of the first stretching or condensing conveyor belt to a second location downstream the upstream end of the second stretching or condensing conveyor belt, wherein the dough handling device is configured for not cutting the dough within the gripping area, in particular by comprising a gripping area free of (active or activatable) cutting means; a controller, for controlling the speed of the first stretching or condensing conveyor belt and/or the second stretching or condensing conveyor belt and/or the relative speed of the first stretching or condensing conveyor belt and the second stretching or condensing conveyor belt and therewith to locally alter the density and/or thickness of the dough sheet.

The invention thus provides a device for modifying an already made dough sheet, in order to locally alter the thickness of the dough sheet, or its density, and in some cases, its width. The first and the second stretching or condensing conveyor belts over which the gipping area extends, allows the device to push the dough in the stretch-or-condense location, in order to condense it, or to pull the dough, in order to stretch it. For this purpose it is important that the dough does not slip with respect to either of the first and the second stretching or condensing conveyor belts. Not slipping requires a certain contact area, that depends on the type of dough and its stickiness, and for a given width of the dough sheet thus a certain contact length. The dough then stretches or condenses at the stretch-or-condense location which is at the take-over between the first and the second stretching or condensing conveyor belts. In this small area the dough does not or not fully contact the first and the second stretching or condensing conveyor belts and is able to move with respect to both conveyor belts.

A suitable type of conveyor belt for manufacturing the first and/or second stretching or condensing conveyor belts made of polyurethane for instance, commercially available as PU belts. The length of the gripping area is normally equally divided over the first and the second condensing conveyor belts, but a different area on each of the belts is thinkable too. Normally the gripping area extends at least 15 cm, preferably at least 30 and more preferably 45 cm over each of the first and second stretching or condensing conveyor belt. A speed difference between the first and second stretching or condensing conveyor belts should not exceed 20%, more particular be less than 5%.

In order to prevent slip and to increase grip, the dough should not be cut within the gripping area. Cutting the dough when the second stretching or condensing conveyor belt has a higher speed than the first stretching or condensing conveyor belts would lead to separating both parts after the cut. For that reason, in a device according to the present invention, a distance from the stretch-or-condense-location to the closest cutting device for cutting the dough sheet in a width direction is at least 15 cm.

In a further embodiment, the controller is further configured for controlling the dough sheet delivery speed of the dough sheeting stage, and in particular to keep the speed of the second stretching or condensing conveyor belt constant. This is beneficial since this allows the dough processing devices in the remainder of the dough line in which the dough handling device according to the invention is placed to be operated at constant speed too. In most cases, the dough handling device according to the invention is near the upstream end of the sheeting process, and the number of devices to of which the speed should be controlled as well is the lowest up front the device according to the invention, while the ease of controlling their throughput speed is the highest.

The controller may further be configured for applying a predetermined stretching-and/or condensing pattern, in particular a pattern related to the length throughput of the dough sheet.

In a lot of cases a homogeneous and constant dough sheet may be required, but in other cases, thickenings may be desired. For instance in the process of creating croissants, a thickened leading edge of a dough piece facilitates rolling up said dough piece in a later stage. The device according to the invention may in such cases be used to create any predetermined pattern in an essentially homogeneous dough sheet.

In a further embodiment, the device according to the invention comprises a weighing unit, located upstream with respect to the stretch-or-condense-location, wherein the weighing unit is configured for determining the weight per length unit of the dough sheet, and wherein the controller is configured for controlling the speed of the first stretching or condensing conveyor belt and the second stretching or condensing conveyor belt and/or the relative speed of the first stretching or condensing conveyor belt and the second stretching or condensing conveyor belt and therewith to locally alter the density and/or thickness of the dough sheet based on a weight determined by the weighing unit.

Such weighing unit may be a unit as described in European Patents EP 2693174 and EP 2846140 by the same applicant. With the aid of such unit, dough densities and/or weights (per length unit) can be determined continuously for a passing dough sheet, and based on this information, for instance, deviations from constant values can be compensated for, and/or specific predetermined patterns can be obtained. In addition or as an alternative to a weighing unit, optical means such as sensors or cameras may be used to determine a weight or density (distribution) of the dough.

The invention may be applied in a situation wherein a single dough sheet is transported on a conveyor belt, but in many situations multiple products are formed simultaneously from multiple parallel dough sheets on the same or on parallel conveyor belts. For that purpose, the device according to the invention may comprise cutting means for cutting the dough sheet in the length direction, and thus dividing the dough sheet into multiple parallel sheets, said parallel sheets extending in the direction of conveyance, wherein the cutting means are located upstream with respect to the dough stretching or condensing stage. This means, that the separated dough sheets are all subject to a dough stretching or condensing stage, which may be one and the same stretching or condensing stage, or separate ones per dough sheet. A device according to the invention may further comprise spreading conveyor belts, to spread the multiple parallel sheets in the width direction.

In another embodiment, the device according to the invention may comprise at least one buffer conveyor belt, having an adjustable belt length, wherein the buffer conveyor belt is located upstream the stretch-or-condense-location. Such buffer conveyor belt may be formed by a conveyor belt with an adjustable effective belt length between an upstream and a downstream end, which adjustable length can be adapted by for instance lifting the conveyor belt in between said upstream and downstream for increasing the effective length between the upstream and downstream end. The buffer belt may be required when the range of the speed difference is that large that the sheeting stage cannot continuously deliver dough at the peak level set by the controller.

In an embodiment, said buffer conveyor belt is the first stretching or condensing conveyor belt. It is also thinkable that the buffer conveyor belt is comprised by the spreading means.

The device according to the invention may also comprise cutting means for cutting the dough sheet or sheets in the width direction, arranged downstream the gripping area. These cutting means for cutting the dough sheet or sheets in the width direction, may be arranged downstream the gripping area on the second conveyor belt, outside the gripping area.

For increasing the grip of the conveyor belt on the dough sheet, a pressure roll on the first and/or second conveyor belt may be applied. Such pressure roll may be configured for free rolling movement, or be driven, in particular in such way that its circumferential speed equals the respective conveyor belt speed belt.

The device according to the invention may further comprise weighing units and/or cutting means for cutting the dough sheet or sheets in the width direction and/or buffer conveyor belts for separate parallel dough sheets.

The controller may in the case of multiple parallel dough lines also be configured to control a weight distribution between parallel dough sheets, cut from a single dough sheet. For that purpose, a weighing unit may be present for each separate conveyor belt conveying one of the parallel dough sheets. Each of these weighing units may be configured for determining the weight per length unit of the dough sheet, and the controller may further be configured for controlling the mutual position in the width direction of the cutting means for cutting the dough sheet in the length direction, based on a weight determined by the weighing unit. Furthermore, the controller may be configured to control the dough sheeting stage, based on measurement data derived downstream said dough sheeting stage.

The invention will now be elucidated into more detail with reference to the following figures, wherein.

Figure 1:
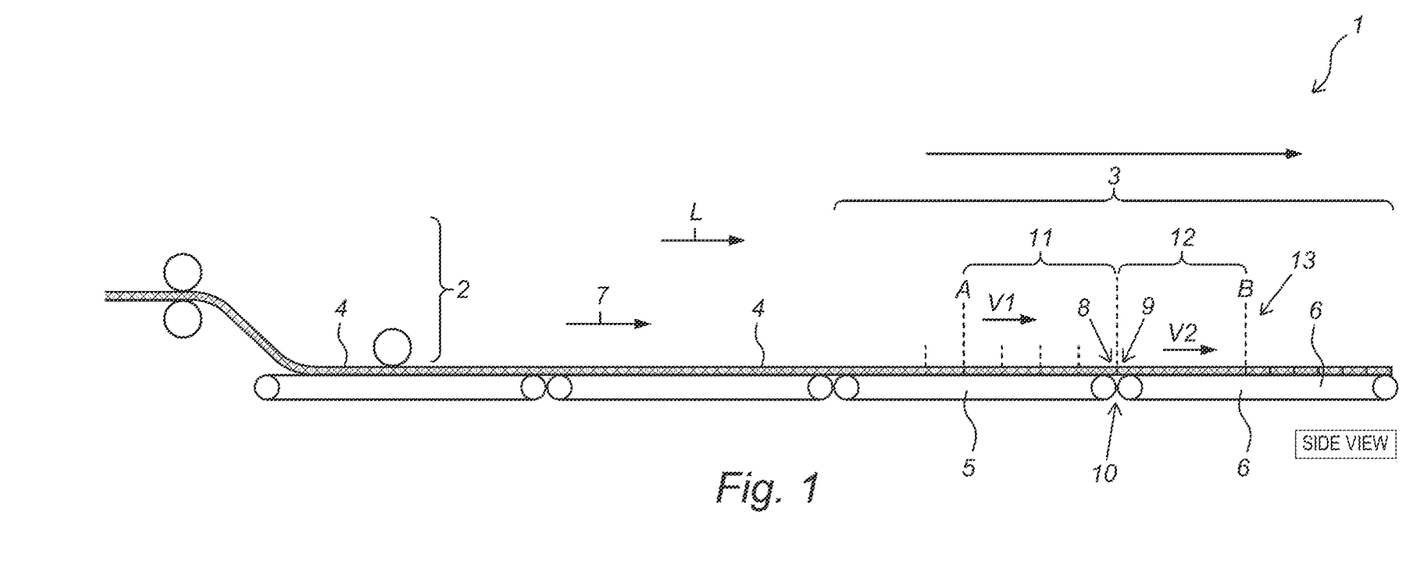
FIG. 1 shows a first schematic view of a device according to the invention.

FIG. 1 shows a schematic view of a dough handling device 1 according to the invention, comprising a dough sheeting stage 2 for delivering a dough sheet 4 and a controllable dough stretching or condensing stage 3, for locally stretching or condensing the dough sheet 4, comprising a first stretching or condensing conveyor belt 5 with a controllable speed V1, configured for receiving, directly or indirectly, the dough sheet 4 from the dough sheeting stage 2 and transporting said dough sheet 4 in a direction of conveyance 7, from upstream to downstream, and a second stretching or condensing conveyor belt 6 with a controllable speed V2 for transporting the dough sheet in said direction of conveyance 7 and extending in line with the first stretching or condensing conveyor belt 5, wherein an upstream end 9 of the second stretching or condensing conveyor belt 6 is adjacent to the downstream end 8 of the first stretching or condensing conveyor belt 5, for taking over dough from the first stretching or condensing conveyor belt 5 to the second stretching or condensing conveyor belt 6 at a stretch-orcondense location 10, wherein the first and the second stretching or condensing conveyor belt each comprise a mutually adjacent gripping area 11, 12 for gripping the dough sheet such that the sheet does not slip with respect to the respective stretching or condensing conveyor belt 5, 6, which gripping area 11, 12 extends from a first location A upstream the downstream end 8 of the first stretching or condensing conveyor belt 5 to a second location B downstream the upstream end 9 of the second stretching or condensing conveyor belt 6 wherein the dough handling device 1 is configured for not cutting the dough 4 within the gripping area 11, 12, in particular by comprising a gripping area 11, 12 free of (active or activatable) cutting means, and a controller (not shown), for controlling the speed of the first stretching or condensing conveyor belt 5 and/or the second stretching or condensing conveyor belt 6 and/or the relative speed of the first stretching or condensing conveyor belt 5 and the second stretching or condensing conveyor belt 6 and therewith to locally alter the density and/or thickness of the dough sheet 4. At a distance from the stretch-or-condense-location 10 there is the closest cutting device 13 for cutting the dough sheet4 in a width direction.

Figure 2:
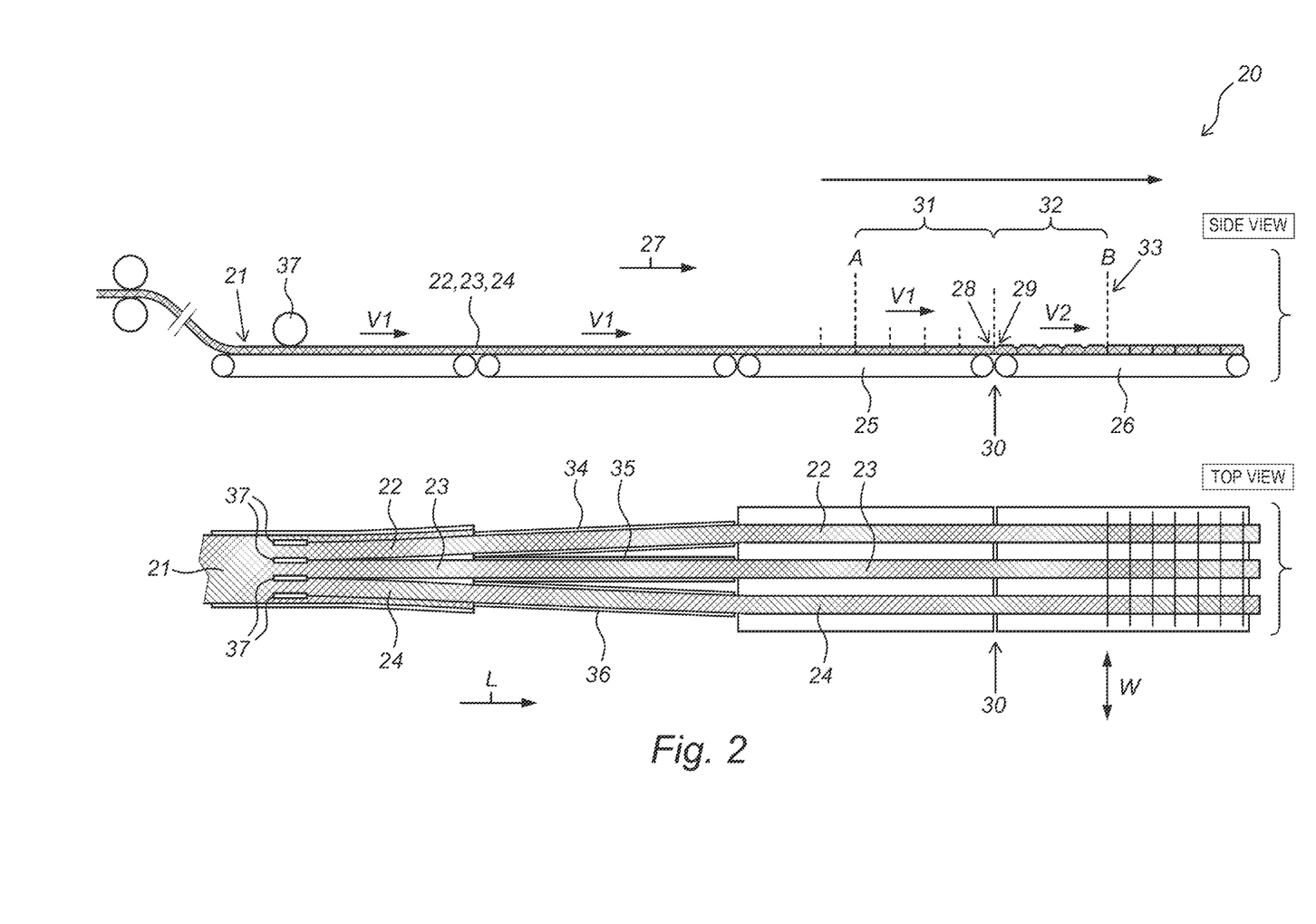
FIG. 2 shows a second schematic view of a device according to the invention.

FIG. 2 shows a second schematic view of a device 20 according to an embodiment of the present invention, for processing multiple parallel dough sheets 22, 23, 24 formed out of one sheet 21. The device comprises a dough sheeting stage (not shown) for delivering the dough sheet 21 and a controllable dough stretching or condensing stage, for locally stretching or condensing the dough sheets 22, 23, 24, comprising a first stretching or condensing conveyor belt 25 with a controllable speed V1, configured for receiving, directly or indirectly, the dough sheets 22, 23, 24 from the dough sheeting stage and transporting said dough sheet 22, 23, 24 in a direction of conveyance 27, from upstream to downstream, and a second stretching or condensing conveyor belt 26 with a controllable speed V2 for transporting the dough sheet in said direction of conveyance 27 and extending in line with the first stretching or condensing conveyor belt 25, wherein an upstream end 29 of the second stretching or condensing conveyor belt 26 is adjacent to the downstream end 28 of the first stretching or condensing conveyor belt 25, for taking over dough from the first stretching or condensing conveyor belt 25 to the second stretching or condensing conveyor belt 26 at a stretch-or-condense location 30, wherein the first and the second stretching or condensing conveyor belt each comprise a mutually adjacent gripping area 31, 32 for gripping the parallel dough sheets 22, 23, 24 such that the sheets do not slip with respect to the respective stretching or condensing conveyor belt 25, 26, which gripping area 31, 32 extends from a first location A upstream the downstream end 28 of the first stretching or condensing conveyor belt 25 to a second location B downstream the upstream end 29 of the second stretching or condensing conveyor belt 26 wherein the dough handling device 20 is configured for not cutting the parallel dough sheets 22, 23, 24 within the gripping area 31, 32, in particular by comprising a gripping area 31, 32 free of (active or activatable) cutting means, and a controller (not shown), for controlling the speed of the first stretching or condensing conveyor belt 25 and/or the second stretching or condensing conveyor belt 26 and/or the relative speed of the first stretching or condensing conveyor belt 25 and the second stretching or condensing conveyor belt 26 and therewith to locally alter the density and/or thickness of the parallel dough sheets 22, 23, 24. At a distance from the stretch-or-condense-location 30 there is the closest cutting device 33 for cutting the parallel dough sheets 22, 23, 24 in a width direction W. The device 20 also comprises cutting means 37 for cutting the dough sheet 21 in the length direction L, and thus dividing the dough sheet into multiple parallel sheets 22, 23, 24, said parallel sheets extending in the direction of conveyance 27, wherein the cutting means are located upstream with respect to the dough stretching or condensing stage. Furthermore, in the embodiment shown, the device comprises spreading means 34, 35, 36, formed by spreading conveyor belts, to spread the multiple parallel sheets 22, 23, 24 in the width direction W.

Figure 3:
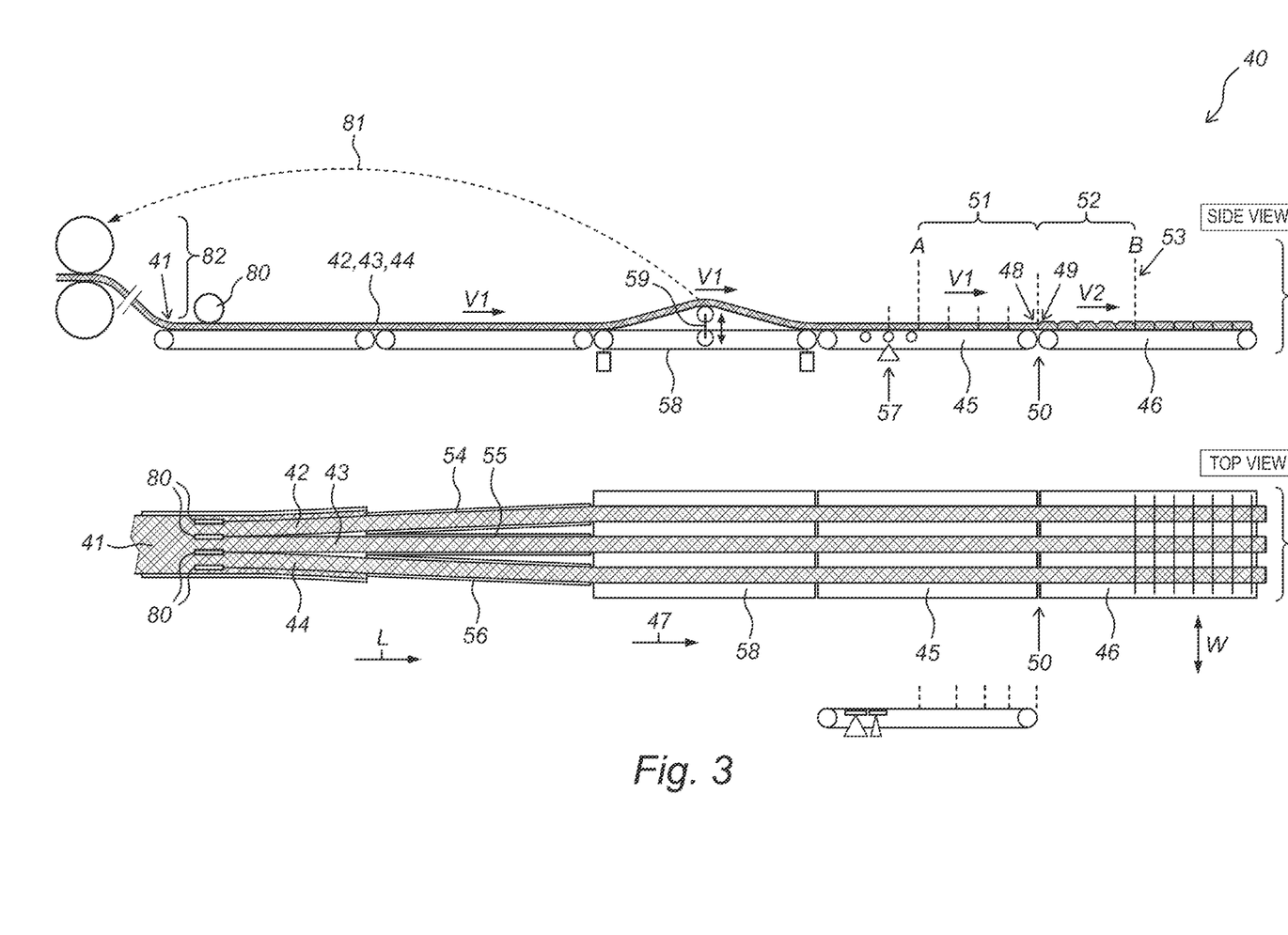
FIG. 3 shows a third schematic view of a device according to the invention.

FIG. 3 shows a second schematic view of a device 40 according to an embodiment of the present invention, for processing multiple parallel dough sheets 42, 43, 44 formed out of one sheet 41. The device comprises a dough sheeting stage (not shown) for delivering the dough sheet 41 and a controllable dough stretching or condensing stage, for locally stretching or condensing the dough sheets 42, 43, 44, comprising a first stretching or condensing conveyor belt 45 with a controllable speed V1, configured for receiving, directly or indirectly, the dough sheets 42, 43, 44 from the dough sheeting stage and transporting said dough sheets 42, 43, 44 in a direction of conveyance 47, from upstream to downstream, and a second stretching or condensing conveyor belt 46 with a controllable speed V2 for transporting the dough sheet in said direction of conveyance 47 and extending in line with the first stretching or condensing conveyor belt 45, wherein an upstream end 49 of the second stretching or condensing conveyor belt 46 is adjacent to the downstream end 48 of the first stretching or condensing conveyor belt 45, for taking over dough from the first stretching or condensing conveyor belt 45 to the second stretching or condensing conveyor belt 46 at a stretch-or-condense location 50, wherein the first and the second stretching or condensing conveyor belt each comprise a mutually adjacent gripping area 51, 52 for gripping the parallel dough sheets 42, 43, 44 such that the sheets do not slip with respect to the respective stretching or condensing conveyor belt 45, 46, which gripping area 51, 52 extends from a first location A upstream the downstream end 48 of the first stretching or condensing conveyor belt 45 to a second location B downstream the upstream end 49 of the second stretching or condensing conveyor belt 46 wherein the dough handling device 40 is configured for not cutting the parallel dough sheets 42, 43, 44 within the gripping area 51, 52, in particular by comprising a gripping area 51, 52 free of (active or activatable) cutting means, and a controller (not shown), for controlling the speed of the first stretching or condensing conveyor belt 45 and/or the second stretching or condensing conveyor belt 46 and/or the relative speed of the first stretching or condensing conveyor belt 45 and the second stretching or condensing conveyor belt 46 and therewith to locally alter the density and/or thickness of the parallel dough sheets 42, 43, 44. At a distance from the stretch-or-condense-location 50 there is the closest cutting device 53 for cutting the parallel dough sheets 42, 43, 44 in a width direction W. The device 40 also comprises cutting means 80 for cutting the dough sheet 41 in the length direction L, and thus dividing the dough sheet into multiple parallel sheets 42, 43, 44, said parallel sheets extending in the direction of conveyance 47, wherein the cutting means are located upstream with respect to the dough stretching or condensing stage. Furthermore, in the embodiment shown, the device comprises spreading means 54, 55, 56, formed by spreading conveyor belts, to spread the multiple parallel sheets 42, 43, 44 in the width direction W. The device 40 further comprises a weighing unit 57, located upstream with respect to the stretch-or-condense-location 50, wherein the weighing unit 57 is configured for determining the weight per length unit of the dough sheet. The device further comprises a buffer conveyor belt 58, having an adjustable effective dough transporting belt length, enabled by moving belt guides 59 wherein the buffer conveyor belt is located upstream the stretch-or-condense-location 50. The figure also shows a feedback loop 81, wherein control data, for instance derived from buffer settings is fed back to the sheeting stage 82, for instance for controlling a gap size or a speed of sheeting rollers.

Figure 4:
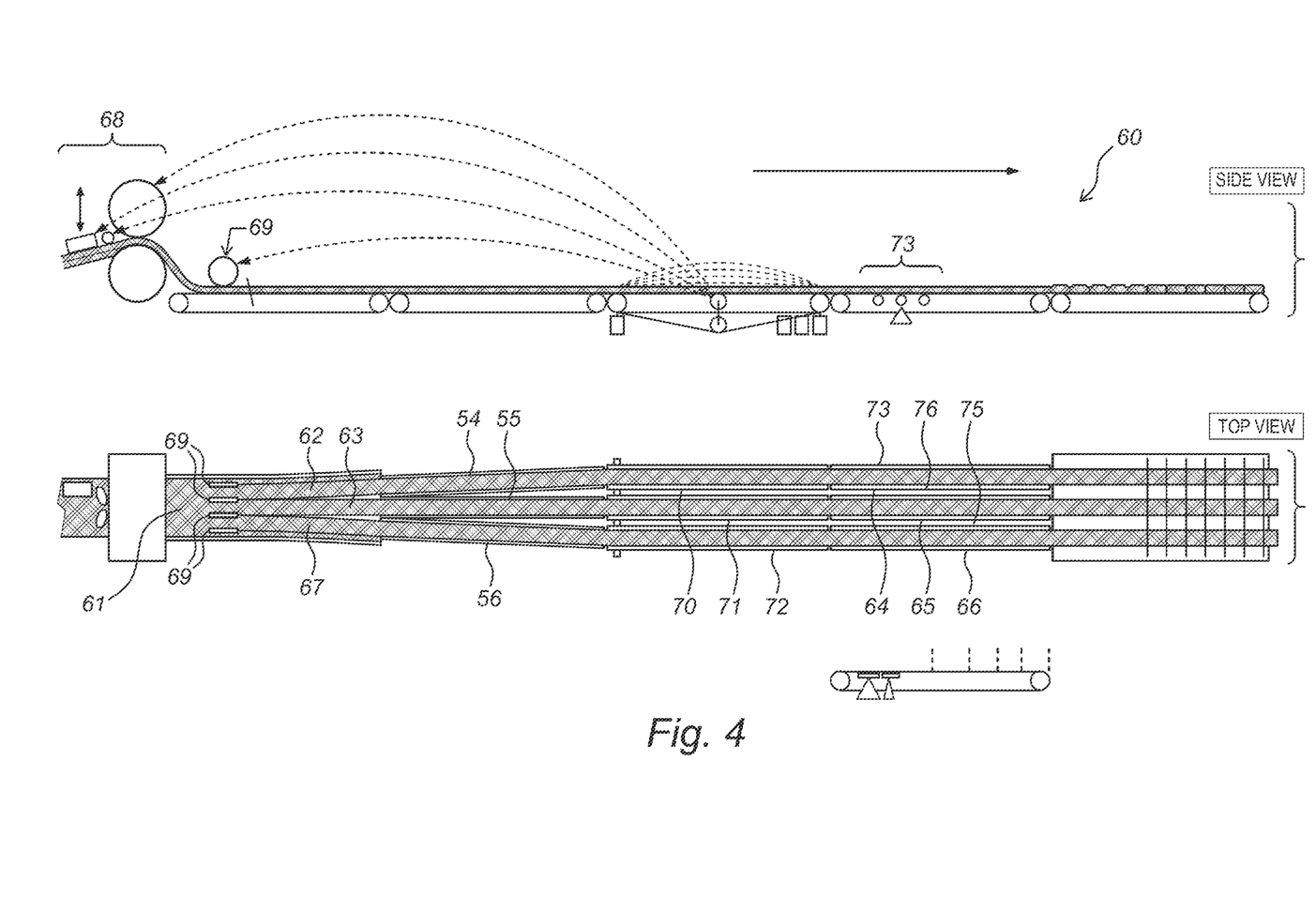
FIG. 4 shows a fourth schematic view of a device according to the invention.

FIG. 4 shows a fourth schematic view 60 of a device according to the invention, which is similar to the system 40 shown in FIG. 3, except for that instead of the single conveyor belts 58 and 45, respective triple conveyor belts 70, 71, 72 and 64, 65, 66 are implemented, each for individually transporting the parallel dough sheets In this embodiment, the controller (not shown) is configured to control a weight and/or density distribution between parallel dough sheets 62, 63, 67, cut from a single dough sheet 61. For that purpose, a weighing unit 73, 74, 75 may be present for each separate conveyor belt conveying one of the parallel dough sheets. Each of these weighing units 73, 74, 75 may be configured for determining the weight per length unit of the dough sheet, and the controller may further be configured for controlling the mutual position in the width direction of the cutting means 69 for cutting the dough sheet in the length direction, based on a weight determined by the weighing unit. This way, the weight and/or density can be adjusted for each of the lanes separately, which may in general be a feature of a device according to the present invention. Furthermore, the controller may be configured to control the dough sheeting stage 68, based on measurement data derived downstream said dough sheeting stage.

The invention claimed is:

1. Dough handling device, comprising:
    a dough sheeting stage,
        for delivering a dough sheet with a predetermined thickness, wherein the predetermined thickness is a maximum of 40 mm, wherein the dough sheeting stage is configured for delivering a dough sheet with thickness and/or density that has a fluctuation of less than 10%, the dough handling device further comprising:
    a controllable dough stretching or condensing stage, for locally stretching or condensing the dough sheet, comprising:
        a first stretching or condensing conveyor belt with a controllable speed, configured for receiving, directly or indirectly, the dough sheet from the dough sheeting stage and transporting said dough sheet in a direction of conveyance, from upstream to downstream;
        a second stretching or condensing conveyor belt with a controllable speed for transporting the dough sheet in said direction of conveyance,
            extending in line with the first stretching or condensing conveyor belt, wherein
            an upstream end of the second stretching or condensing conveyor belt is adjacent to the downstream end of the first stretching or condensing conveyor belt, for taking over dough from the first stretching or condensing conveyor belt to the second stretching or condensing conveyor belt at a stretch-or-condense location, wherein the first and the second stretching or condensing conveyor belt each comprise:
            a mutually adjacent gripping area for gripping the dough sheet such that at least in a part of the gripping area the sheet does not slip with respect to the respective stretching or condensing conveyor belt, which gripping area extends from a first location upstream the downstream end of the first stretching or condensing conveyor belt to a second location downstream the upstream end of the second stretching or condensing conveyor belt,
            the stretch-or-condense location which is at the take-over between the first and the second stretching or condensing conveyor belts;
    wherein
        the dough handling device is configured for not cutting the dough within the gripping area, by comprising a gripping area free of cutting means;
    a controller, for controlling the speed of the first stretching or condensing conveyor belt and/or the second stretching or condensing conveyor belt and/or the relative speed of the first stretching or condensing conveyor belt and the second stretching or condensing conveyor belt and therewith to locally alter the density and/or thickness of the dough sheet at the take-over between the first and the second stretching or condensing conveyor belts.

2. Device according to claim 1, wherein a distance from the stretch-or-condense-location to a closest cutting device for cutting the dough sheet in a width direction is at least 15 cm.

3. Device according to claim 1, wherein the controller is further configured for controlling the dough sheet delivery speed of the dough sheeting stage, and wherein the controller is configured to keep the speed of the second stretching or condensing conveyor belt constant.

4. Device according to claim 1, wherein the controller is configured for applying a predetermined stretching-and/or condensing pattern, wherein a pattern related to the length throughput of the dough sheet.

5. Device according to claim 1, comprising a weighing unit, located upstream with respect to the stretch-or-condense-location, wherein the weighing unit is configured for determining the weight per length unit of the dough sheet, and wherein the controller is configured for controlling the speed of the first stretching or condensing conveyor belt and the second stretching or condensing conveyor belt and/or the relative speed of the first stretching or condensing conveyor belt and the second stretching or condensing conveyor belt and therewith to locally alter the density and/or thickness of the dough sheet based on a weight determined by the weighing unit.

6. Device according to claim 1, comprising cutting means for cutting the dough sheet in the length direction, and thus dividing the dough sheet into multiple parallel sheets, said parallel sheets extending in the direction of conveyance, wherein the cutting means are located upstream with respect to the dough stretching or condensing stage.

7. Device according to claim 6, comprising spreading means, to spread the multiple parallel sheets in the width direction.

8. Device according to claim 6, comprising weighing units and or cutting means for cutting the dough sheet or sheets in the width direction and/or buffer conveyor belts for separate parallel dough sheets.

9. Device according to claim 1, comprising at least one buffer conveyor belt, having an adjustable belt length, wherein the buffer conveyor belt is located upstream of the stretch-or-condense-location.

10. Device according to claim 9, wherein the buffer conveyor belt is the first stretching or condensing conveyor belt.

11. Device according to claim 9, wherein the buffer conveyor belt is comprised by the spreading means.

12. Device according to claim 9, wherein the buffer conveyor belt comprises the cutting means for cutting the dough sheet in the length direction.

13. Device according to claim 1, comprising cutting means for cutting dough sheet or sheets in the width direction, arranged downstream the gripping area.

14. Device according to claim 13, wherein the cutting means for cutting the dough sheet or sheets in the width direction, arranged downstream the gripping area are on the second conveyor belt, outside the gripping area.

15. Device according to claim 1, comprising a pressure roll on the first and/or second conveyor belt, for increasing the grip on the dough sheet.

16. Device according to claim 1, wherein the controller is configured for controlling a weight distribution between parallel dough sheets, cut from a single dough sheet, based on a determined weight per length unit of each parallel dough sheet, by controlling a mutual position in the width direction of cutting means for cutting the dough sheet in the length direction and/or the controller may be configured to control the dough sheeting stage.

* * * * *